Nov. 18, 1969         ERNST-AUGUST BIELEFELDT         3,478,989
                          SUPERSONIC AIRCRAFT

Filed Nov. 14, 1966                              5 Sheets-Sheet 1

E. A. Bielefeldt
INVENTOR.

By Karl F. Ross
Attorney

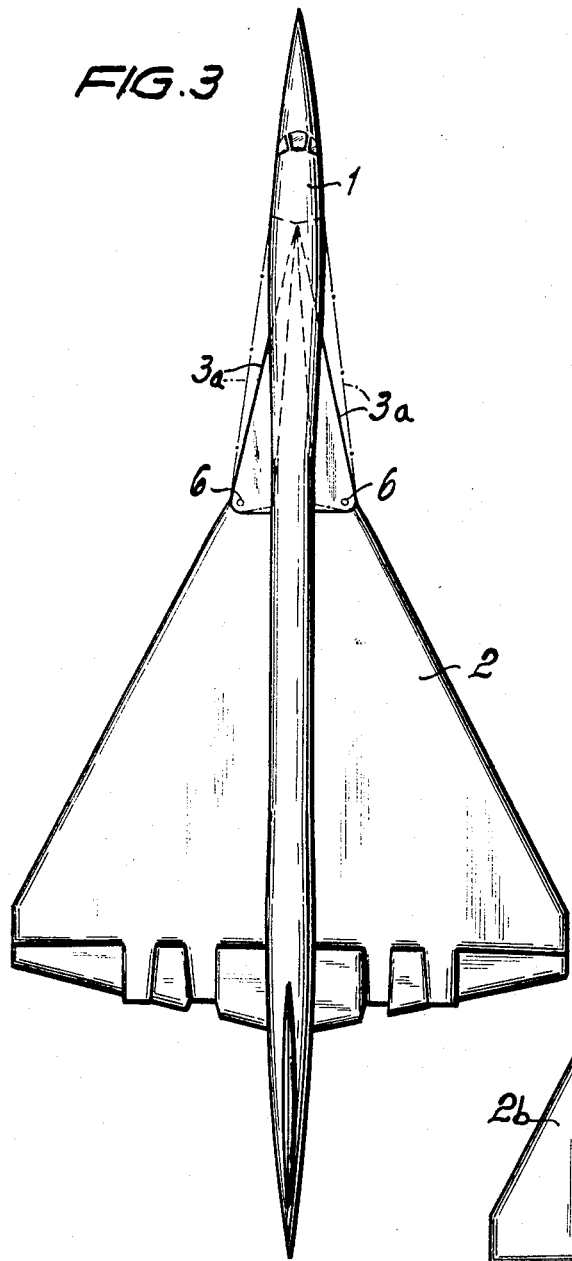
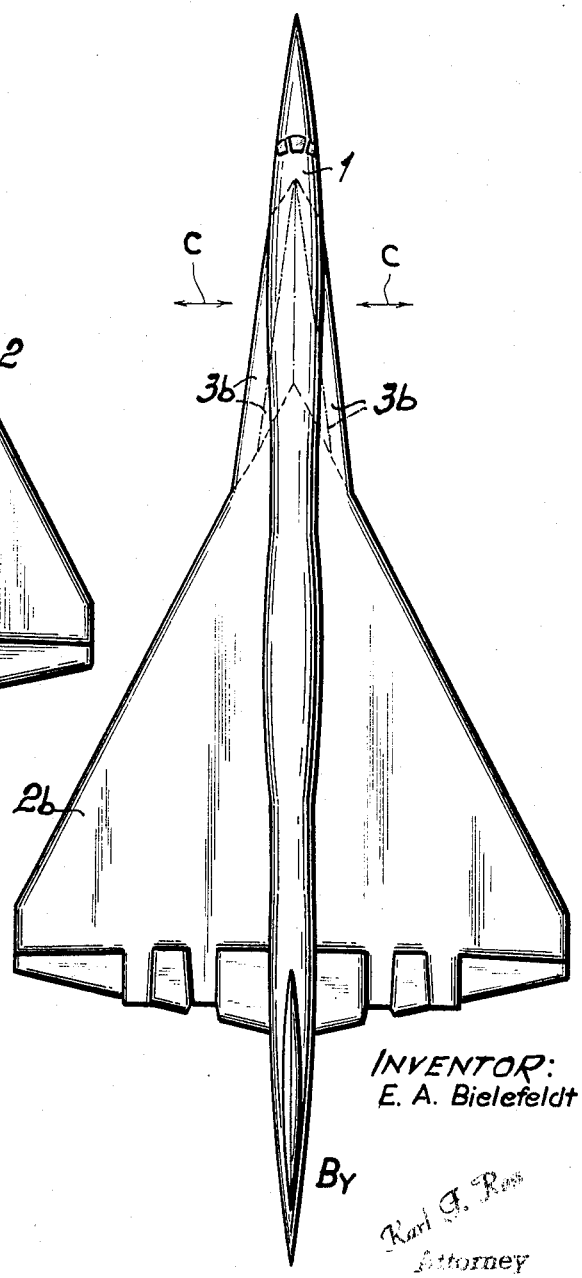

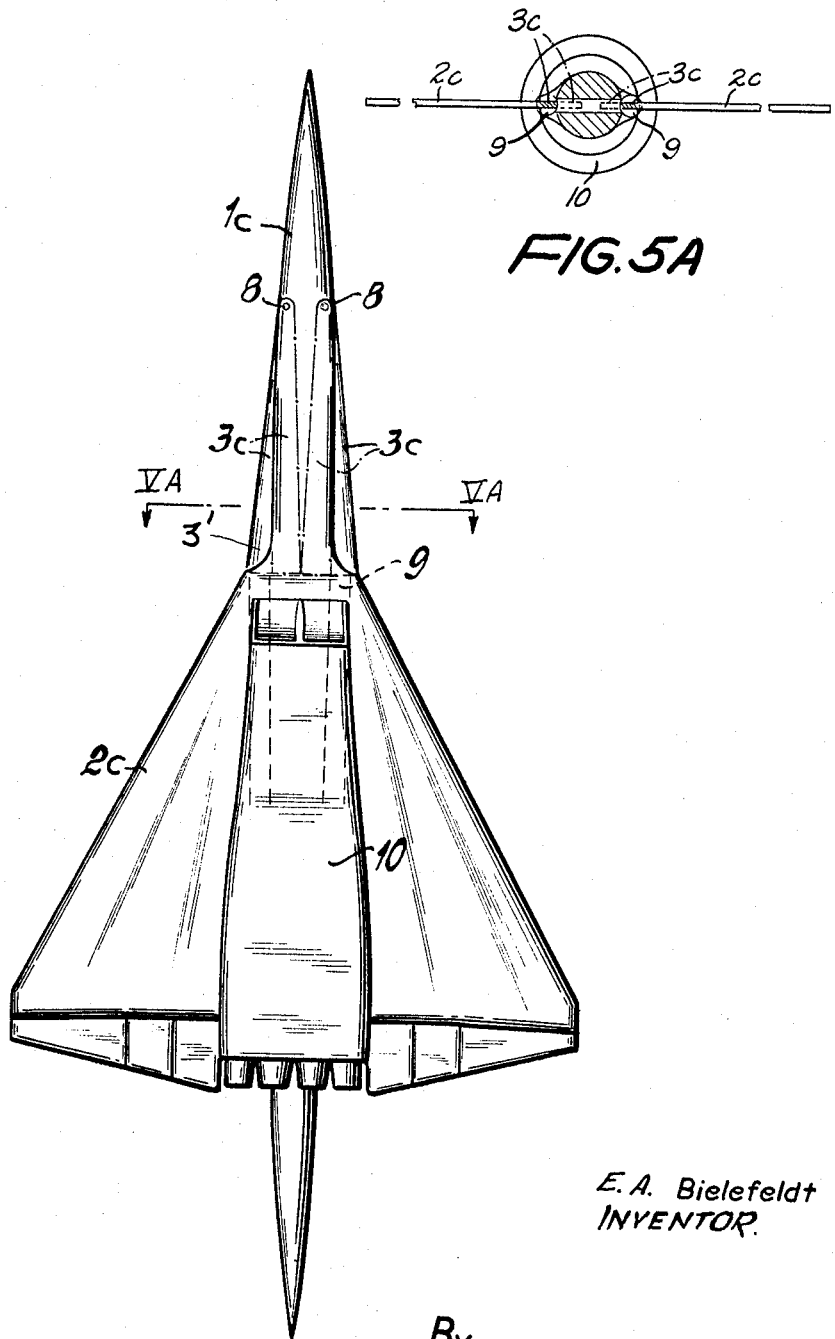

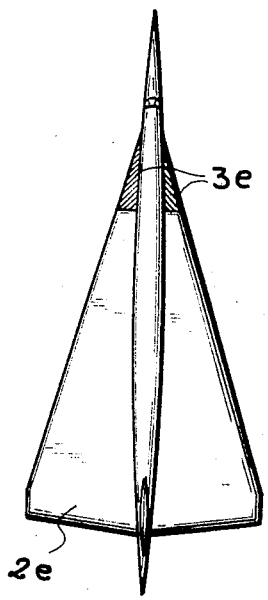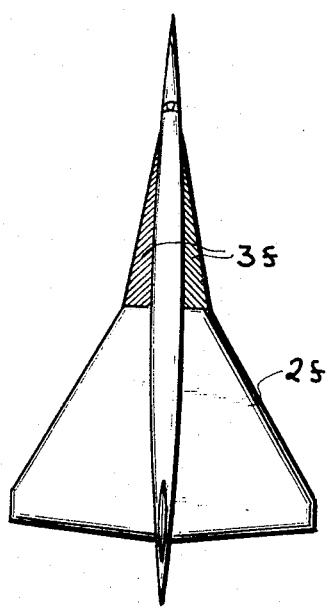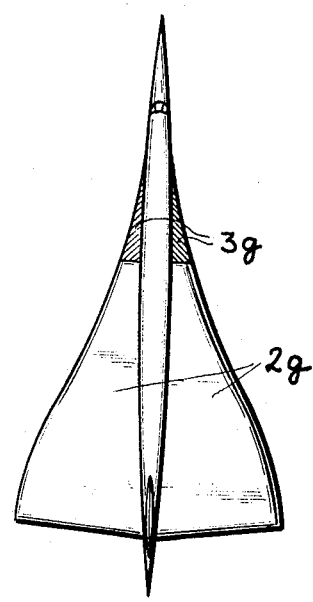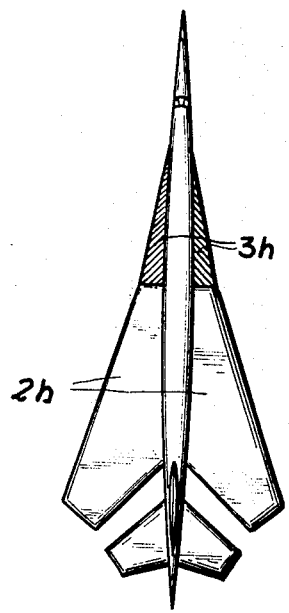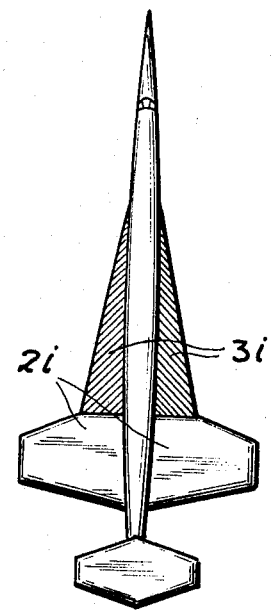

United States Patent Office 3,478,989
Patented Nov. 18, 1969

3,478,989
SUPERSONIC AIRCRAFT
Ernst-August Bielefeldt, Hamburg, Germany, assignor to Hamburger Flugzeugbau GmbH, a corporation of Germany
Filed Nov. 14, 1966, Ser. No. 593,822
Int. Cl. B64c 3/54, 9/36
U.S. Cl. 244—43     6 Claims

ABSTRACT OF THE DISCLOSURE

Supersonic aircraft equipped with one or more auxiliary airfoils forwardly of its wing structure movable to counteract shifts in the neutral point of the craft upon an increase in speed beyond Mach 1.

---

My present invention relates to fixed-wing aircraft adapted for propulsion at supersonic speeds.

Experience has shown that the neutral point of the fixed-wing structure of such aircraft tends to shift as the craft breaks through the sound barrier, i.e. as it attains velocities greater than Mach 1. The magnitude of this shift of the neutral point depends on the wing shape and is minimized by the conventional triangular configuration known as delta wing. Even there, however, an appreciable tilt of the trim tabs is necessary to maintain aerodynamic stability at supersonic speeds, this tilt resulting in an increase in the aerodynamic resistance of the craft. Prior attempts to reduce this trim tab resistance by a special shaping of the wing surface, such as an upward curving of the forward portion of the wing, have been only partly successful.

The general object of this invention is, therefore, to provide means in a supersonic fixed-wing aircraft for effectively counteracting the shifting of the neutral point at velocities above Mach 1 without any objectionable increase in air resistance.

A more particular object of this invention is to provide aerodynamic stabilization means of this character applicable, with but minor modifications, to any type of conventional wing structure of invariable aspect ratio.

These objects are realized, in accordance with my present invention, by the provision of one or more auxiliary airfoils movably disposed immediately in front of the wing forwardly converging fixed structure so as to be displaceable, by manual or automatic control means, to counteract shifts in the neutral point of the craft upon penetration of the sound barrier.

There are, fundamentally, two ways in which an auxiliary airfoil according to this invention may be displaced between a relatively ineffective position (for subsonic speeds) and an effective position (for supersonic velocities). The first way is to mount the airfoil in a pivotable manner so as to make it swingable about an axis substantially parallel to the pitch axis of the craft, thereby enabling a change in the pitch angle included between the auxiliary airfoil and the main wing. Another way is to make the auxiliary airfoil wholly or partly retractable into the fuselage of the craft by displacement in a plane generally perpendicular to the yaw axis thereof, be it by rotation about an axis substantially parallel to the yaw axis, be it by translatory motion preferably in a direction generally parallel to the pitch axis. Naturally, both measures could be combined to make the foil both tiltable and retractable into the fuselage.

In a jet propulsion system it is often convenient to throttle the air intake of the engines as the craft reaches its cruising speed and thus requires no further acceleration. Thus, in accordance with a further feature of my invention, the auxiliary airfoil—particularly when retractable into the fuselage—may have a portion so positioned adjacent an air-intake port of a jet engine as to obstruct that port in its outwardly extended position (i.e. at supersonic speed) while unblocking the port when retracted into the fuselage.

Naturally, the auxiliary airfoil according to this invention may be so controlled as to move into positions of progressively increased aerodynamic effectiveness with increasing forward speed of the craft. Thus, different operating positions may be assigned to the airfoil for different Mach numbers. If the control of the airfoil position is automatic, e.g. by conventional means responsive to devices (such as Pitot tubes) used to measure air speed, the pilot will not be diverted from his other tasks as the craft passes through the region of Mach 1 or any other speed zone where a repositioning of the auxiliary airfoil is necessary.

The invention will be described in greater detail with reference to the accompanying drawing in which:

FIG. 3 is a plan view of the craft shown in FIG. 2;

FIGS. 4 and 5 are views similar to FIG. 3, illustrating further modifications;

FIG. 5A is a cross-sectional view taken on the line VA—VA of FIG. 5;

FIGS. 7–11 are plan views of still other aircraft having a variety of wing structures equipped with auxiliary airfoils according to the invention.

Figure 1:
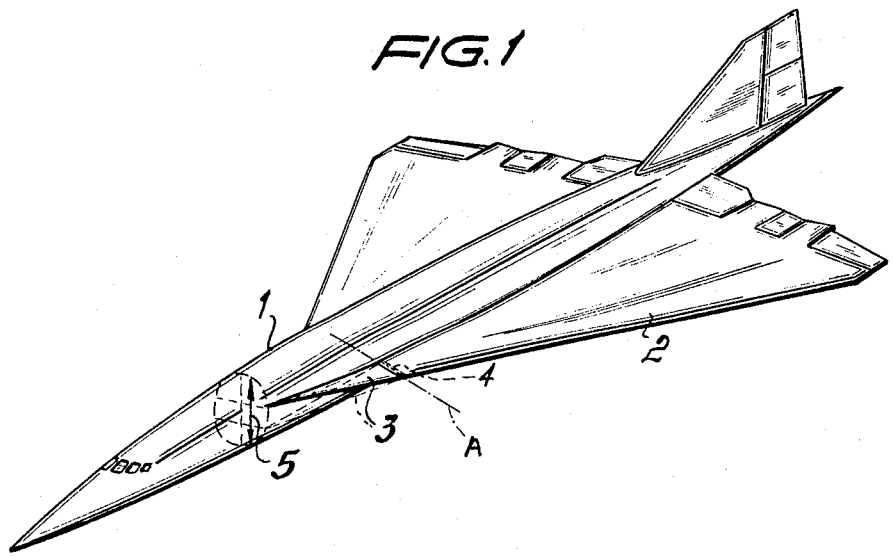
FIGS. 1 and 2 are perspective views of aircraft equipped with auxiliary airfoils representing two different embodiments of the invention.
Figure 6:
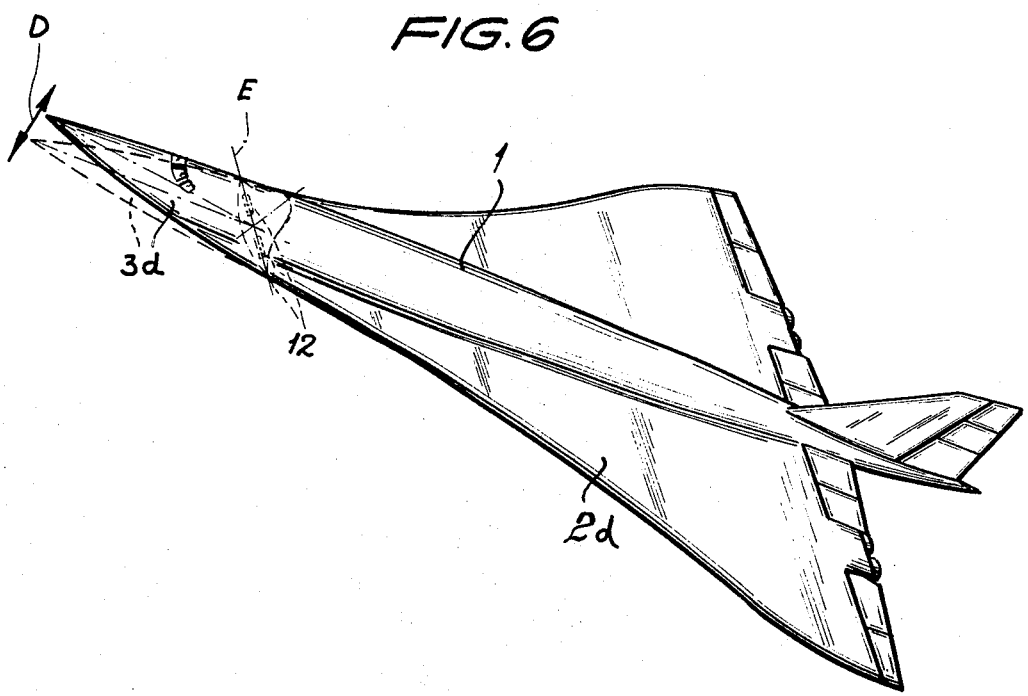
FIG. 6 is another perspective view of a craft provided with an auxiliary airfoil representing a further modification of a system according to the invention.

In FIG. 1 I have shown a supersonic aircraft with fuselage 1 and delta wings 2 as well as the usual tail assembly which need not be further described. A pair of auxiliary airfoils 3 (only one shown), of forwardly pointed triangular configuration, are disposed ahead of wings 2 on opposite sides of the fuselage 1. A narrow gap 4 separates the airfoils 3 from the front edges of the associated wings 2, this gap increasing the effectiveness of the airfoil in counteracting a shift of the aerodynamic neutral point. It is, however, also possible to eliminate the gap 4 and to attach the airfoils directly to the main wings, e.g. by hinged connections as shown in FIG. 6 described hereinafter.

A control mechanism, diagrammatically represented by an arrow 5, serves to displace the airfoil 3 between an ineffectual starting position substantially coplanar with wing 2, as indicated in dot-dash lines, and an upwardly pitched operating position (full lines) into which it can be tilted by rotation about an axis A parallel to the pitch axis of the craft. Such an upward inclination of the airfoil 3 results, particularly at supersonic speeds, in a favorable lift distribution above the main wing 2. Moreover, the presence of the uptilted foil tends to produce turbulence, increasing with pitch angle, above the upper wing surface which prevents an objectionable increase in the thickness of the boundary layer therealong and shifts the region of detachment of that layer toward the rear edge of the wing. The resulting flow pattern enhances the directional stability of the craft and the effectiveness of its rudder with large angles of deflection.

Figure 2:
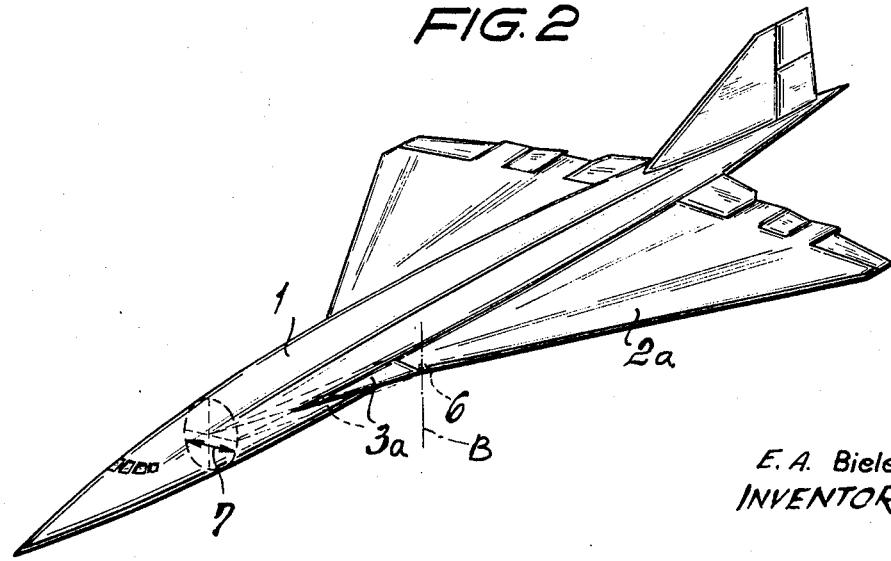

The craft shown in FIGS. 2 and 3 is generally similar to that of FIG. 1 and has a pair of delta wings 2a on opposite sides of its fuselage 1a. Auxiliary airfoils 3a are pivoted at 6 to the associated main wings 2a so as to be swingable about an axis B, parallel to the yaw axis of the craft, for partial withdrawal into the fuselage 1a by means of a control mechanism diagrammatically indicated by an arrow 7 in FIG. 2. In this embodiment the partially withdrawn position of the auxiliary airfoils 3*a* has been shown in full lines, there operative position outside the fuselage 1*a* having been indicated in dot-dash lines. In this operative position, the foils 3*a* may include with the wings 2*a* the same pitch angle as the one defined between wing 2 and airfoil 3 in the uptilted position of the latter as shown in FIG. 1.

The craft shown in FIG. 4 differs from that of FIGS. 2 and 3 in that the airfoils 3*b*, positioned forwardly of wings 2*b*, are not swingable but are displaceable between their extended position (full lines) and their retracted position (dot-dash lines) by translatory motion parallel to the pitch axis of the craft, as indicated by arrows C. Again, the airfoils may have an upward pitch as described in connection with FIGS. 2 and 3.

In FIGS. 5 and 5A I have shown another supersonic aircraft of the delta-wing type whose auxiliary airfoils 3*c* are pivoted at their forward points 8 to the fuselage 1*c*, being thus again swingable between an operative position (full lines) and a retracted position (dot-dash lines). The power plant 10 of the craft comprises a set of conventional jet engines with ducts have air-intake ports 9 at the forward edge of the wings 2*c*. A rear portion 3' of each airfoil 3*c* obstructs the intake ports 9 in the outwardly extended (full-line) position of the airfoil, this being the position occupied when the aircraft attains its cruising speed and when throttling of the air intake becomes desirable, as pointed out above.

The aircraft shown in FIG. 6 is of the so-called flying-wing type and has an auxiliary airfoil 3*d* tiltable, as indicated by an arrow D, about an axis E (parallel to the pitch axis of the craft) in the vicinity of the forward edge of wing 2*d* to which the foil is shown connected by hinges 12.

Finally, I have shown in FIGS. 7–11 a variety of supersonic aircraft with diverse wing structures 2*e*, 2*f*, 2*g*, 2*h* and 2*i* and auxiliary airfoils 3*e*, 3*f*, 3*g*, 3*h* and 3*i* according to the invention. These airfoils may adjoin the front edges of the associated main wings with or without spacing and may be upwardly tiltable and/or retractable into the fuselage as hereinabove described. In every instance, the forwardly converging lateral edges of the extended airfoils directly adjoin a pair of similarly converging side edges of the main wing structure.

The presence of the mobile auxiliary airfoil according to my invention, uptilted at supersonic speeds, changes the attitude of the substantially larger wing structure only slightly and does not result in an increased aerodynamic resistance comparable to that produced by the upturned trim tabs of the conventional craft. The aspect ratio of the main wing or wings is invariable in each case.

The invention is, of course, not limited to the embodiments specifically disclosed but may be realized in various modifications readily apparent to persons skilled in the art.

I claim:

1. An aircraft comprising a fuselage, a pair of wings of invariable aspect ratio fixed with reference to said fuselage on opposite sides thereof, propulsion means capable of generating supersonic velocities, and stabilizer means for said wings, said stabilizer means comprising auxiliary airfoil means substantially smaller than said wings and with forwardly converging lateral edges located immediately forwardly of said wings and control means for displacing said airfoil means relatively to said wings to counteract shifts in the neutral point of said wings upon an increase in speed beyond Mach 1, said wings having a pair of forwardly converging side edges terminating near said lateral edges in an effective position of said airfoil means, said airfoil means being in the form of a pair of flaps symmetrically positioned alongside a forward part of said fuselage and at least partly withdrawable into same in a plane generally perpendicular to the yaw axis of the craft, said flaps in their extended position forming a substantially continuous surface with said wings.

2. An aircraft as defined in claim 1 wherein said propulsion means comprises at least one pair of jet engines with air intakes adjacent said fuselage, said flaps having portions disposed to obstruct said intakes in an outwardly extended position of said flaps.

3. An aircraft as defined in claim 1 wherein said flaps are mounted for rotation about axes substantially parallel to said yaw axis.

4. An aircraft as defined in claim 1 wherein said flaps are mounted for translatory motion generally parallel to the pitch axis of the craft.

5. An aircraft as defined in claim 1 wherein said airfoil means is separated by a narrow transverse gap from a front edge of said wings.

6. An aircraft as defined in claim 1 wherein said flaps are of forwardly pointed triangular configuration.

References Cited

UNITED STATES PATENTS

| | | | |
|---|---|---|---|
| 2,822,995 | 2/1958 | Bowen | 249—43 |
| 3,064,928 | 11/1962 | Toll | 244—43 X |

FOREIGN PATENTS

| | | |
|---|---|---|
| 813,568 | 5/1959 | Great Britain. |
| 935,656 | 9/1963 | Great Britain. |

MILTON BUCHLER, Primary Examiner

J. L. FORMAN, Assistant Examiner

U.S. Cl. X.R.

244—46, 55, 120